Sept. 24, 1940.  R. F. BEAN  2,215,994
JUICE EXTRACTOR
Original Filed Sept. 28, 1937
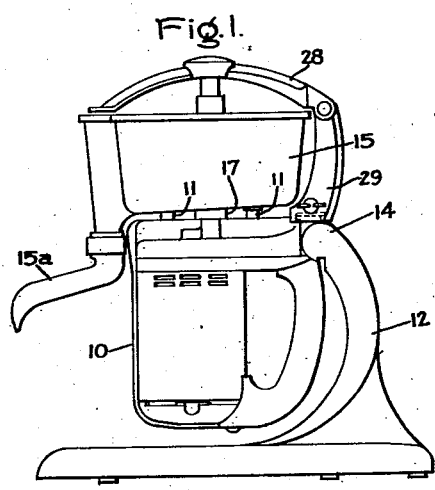
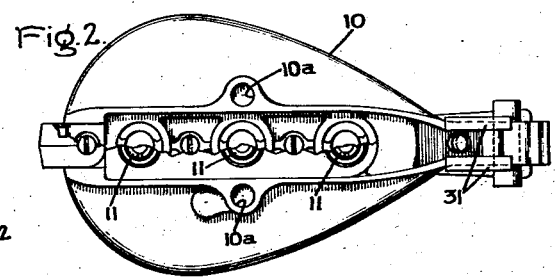
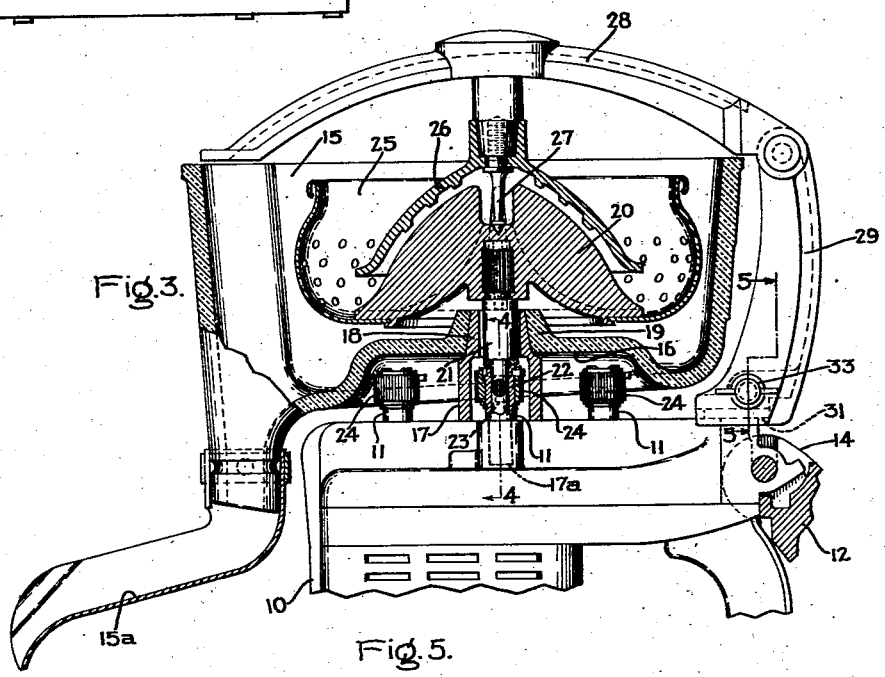
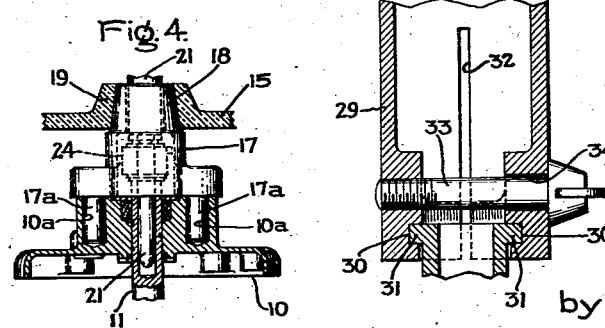
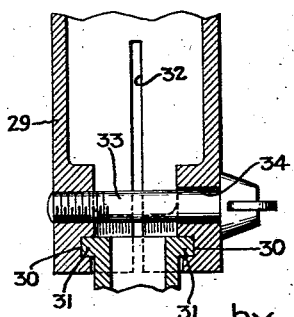
Inventor:
Robert F. Bean,
by Harry E. Dunham
His Attorney.

Patented Sept. 24, 1940

2,215,994

UNITED STATES PATENT OFFICE 2,215,994

JUICE EXTRACTOR

Robert F. Bean, Bridgeport, Conn., assignor to General Electric Company, a corporation of New York Original application September 28, 1937, Serial No. 166,063. Divided and this application September 8, 1938, Serial No. 228,970

2 Claims. (Cl. 146—3)

This invention relates to juice extractors, more particularly to juice extractors that are associated with food mixing devices having a power-operated driving unit, and it has for its object the provision of a simple, inexpensive and efficient device of this character.

This invention is a division of my copending application, Ser. No. 166,063, filed September 28, 1937.

For a more complete understanding of this invention, reference should be had to the accompanying drawing in which Fig. 1 is a side elevation of a juice extracting device embodying this invention; Fig. 2 is an enlarged plan view of the power unit used in the juice extractor of Fig. 1; Fig. 3 is an enlarged fragmentary view in side elevation illustrating a portion of the juice extracting device of Figs. 1 and 2, parts being shown in section so as to illustrate certain details of construction; Fig. 4 is a fragmentary sectional view taken through the line 4—4 of Fig. 3 and looking in the direction of the arrows; and Fig. 5 is an enlarged fragmentary sectional view taken through the line 5—5 of Fig. 3 and looking in the direction of the arrows.

Referring to the drawing, this invention has been shown in one form as applied to a juice extractor associated with the food mixing device described and claimed in my above mentioned copending application. As shown, a power unit 10 is provided which is used to drive the juice extractor. It will be understood that the power unit 10 is provided with a suitable electric motor which is arranged to drive a plurality of shafts 11 arranged in a spaced-apart relation. There are three of these shafts illustrated and they are used to drive three beater elements, as shown in my above-mentioned copending application. The power unit 10 when it is used to operate the juice extractor is supported on a suitable base 12 with the shafts 11 projecting upwardly from the unit, as clearly shown in Figs. 1 and 3. A suitable hinge structure 14 is used to connect the power unit to the standard 12. This hinge structure is described and claimed in my copending application, Ser. No. 228,971, filed September 8, 1938.

When the power unit is supported in this position, I prefer to use the central driving shaft 11 to operate the juice extractor. The juice extracting device arranged in accordance with this invention comprises a juice extracting or collecting bowl 15 which is arranged to be positioned on top of the power unit, as shown in Figs. 1 and 3. The bowl 15 is provided with a discharge spout 15a.

The bowl 15 is provided with an elongated central reentrant section 16 which receives the upwardly projecting shafts 11, as clearly shown in Fig. 3. The bowl is further provided with a hollow sleeve-like supporting and spacing member 17 which surrounds the central shaft 11. As shown, the member 17 is provided with an inwardly tapered section 18 at the top which fits into a corresponding complementary tapered section 19 in the lower wall of the juice collecting bowl 15 to support the bowl 15 in an elevated position above the power unit 10.

The sleeve member 17 also is provided with a pair of spaced downwardly extending feet or pins 17a (Fig. 4) which are received in a pair of spaced sockets 10a that are provided for them in the power unit 10 on opposite sides of the central driving shaft 11. These sockets function to support the sleeve member 17, and hence the juice extracting bowl 15.

Positioned within the juice extracting bowl 15 is a juice extracting reamer 20 which has a driving shaft 21 that extends downwardly through the sleeve supporting member 17 so as to have a driving connection with the central driving shaft 11. As shown more clearly in Fig. 4, this central driving shaft 11 is hollow at its upper end and this hollow end receives the driving shaft 21 of the reamer in telescopic relation. The driving shaft 21 is provided with a pair of driving ears or lugs 22 positioned on opposite sides of the shaft and received in slots 23 positioned in opposite sides of the upper end of the central driving shaft 11 so as to effect a driving connection between the two shafts.

The shafts 11 carry suitable collars 24 which are used to lock the driving spindles of the beater elements to the shafts, as described and claimed in my copending application Ser. No. 228,972, filed September 8, 1938. These collars perform no function in the instant application because the driving connection between the reamer 20 and the shaft 11 is effected solely by means of the driving lugs 22 and the slots 23 which receive them.

The reamer 20 carries a centrifugal straining member 25 which is arranged to extract the juice from the pulp and seeds by centrifugal action as the reamer rotates.

Cooperating with the reamer is a cup-shaped fruit holder 26 having an impaling member 27 which secures the half fruit in the cup. The cup 26 is supported by an arm 28 which is pivoted on a standard 29. The standard 29 at its lower end is provided with spaced-apart parallel channels 30 (Fig. 5). The channels 30 are arranged to slide on a pair of parallel flanges 31 provided for them on the power unit 10. This lower end of the standard 29 is split or divided in two sections by a slit or cut 32. A screw 33 passes freely through an aperture 34 provided for it in one-half of the split end section and has its inner end threaded in the other end section so that it may be turned in to force the end sections together thereby to lock the standard to the flanges 31.

It will be understood that when it is desired to operate the juice extractor, the power unit 10 is placed on the standard 12 in its position shown in Figs. 1 and 3. The support 17 is then placed on the power unit with its two pins 17a inserted in the sockets 10a, and then the juicer bowl 15 is placed on the support. The reamer may then be placed in the bowl in driving relation with the central shaft 11, and then the fruit holder standard 29 will be attached to the channels 31 and locked by the screw member 33. The half fruit is then placed within the cup 26 and is brought into extracting relation with the reamer by pivoting the arm 28 downwardly toward its position shown in Fig. 3. The juice which is extracted is separated from the seeds and pulp by means of the strainer 25 and is discharged through the spout 15a.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States, is:

1. In a food-working device, a juice extractor comprising a power unit having a plurality of spaced operating shafts, means for supporting the power unit with said shafts projecting upwardly therefrom, a juice extracting bowl constructed and arranged to be mounted on said power unit, said bowl having a longitudinal centrally arranged reentrant portion in its bottom wall into which said shafts project, a support on said power unit entering said reentrant portion and engaging said bowl to hold it in said operative position on said power unit, a reamer in said bowl, and means for effecting a driving connection between said reamer and one of said shafts.

2. A juice extracting device comprising a power unit having an upwardly projecting driving shaft and a plurality of sockets adjacent said shaft, a sleeve-like support surrounding said shaft having a plurality of pins received in said sockets, and also provided with an inwardly tapered section at the top, a juice-extracting bowl having in its bottom wall a tapered section complementary to said tapered section on said support and fitted thereon to support said bowl on said power unit, a reamer in said bowl having a shaft extending down into said support for connection with said driving shaft, and means within said support effecting a driving connection between said reamer shaft and said driving shaft.

ROBERT F. BEAN.